UNITED STATES PATENT OFFICE 1,987,538

WATER-SOLUBLE ANTHRAQUINONE DYE-STUFFS AND PROCESS FOR MAKING SAME

Albin Peter, Basel, Switzerland, assignor to firm "Chemical Works formerly Sandoz", Basel, Switzerland No Drawing. Application January 31, 1934, Serial No. 709,236. In Switzerland February 8, 1933

9 Claims. (Cl. 260—60)

It has been found, that new, water-soluble anthraquinone dyestuffs can be prepared by condensing 1-amino-2-sulpho-4-halogen anthraquinones with 4-amino-1-methylbenzene-2-sulph-(alkyl)-amides. As alkylamides the mono- and dimethyl or mono- and diethyl derivatives may be used. In order to carry out the present invention, the starting compounds are heated in an aqueous solution or suspension and in presence of acid binding agents and of catalyzers, until the condensation has completely occurred.

As acid binding agents compounds such as sodium bicarbonate and potassium bicarbonate may be used. As catalyzers those generally used in the synthesis of anthraquinone compounds, like copper and copper compounds may be employed.

The condensation may be carried out in an open or closed vessel and eventually under pressure and at temperatures of 50–150° C., whereby temperatures of 60–90° C. are preferably used.

It is further preferable to use for the condensation equimolecular quantities of the starting compounds, but an excess of one of the components can also be employed, and it may be advantageous to work in a carbon dioxide atmosphere, in order to refrain the dissociation of the acid binding agent.

The end of the condensation is indicated by the fact that the reaction mixture does not become bluer.

The products obtained by the present process are isolated from the reaction mixture by pouring same into acidified water or an aqueous solution of a salt, separating the precipitate by filtration, dissolving it in water and salting it out from its solution.

The dyestuffs obtained in this manner possess the following general formula:

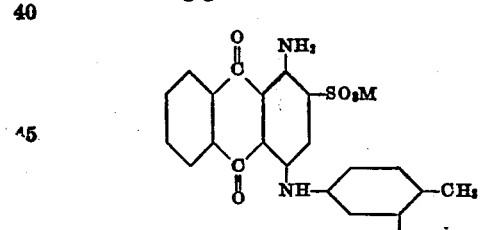

wherein A represents an alkylated amino group and M represents an alkali metal. They dye animal fibres blue shade of excellent fastness to milling, washing, perspiration and light.

One object of the present invention is a process for the manufacture of water-soluble dyestuffs of the anthraquinone series, consisting in that 1-amino-2-sulpho-4-halogenanthraquinone is condensed with 4-amino-1-methylbenzene-2-sulph-(alkyl) amides.

Another object of the present invention is a process for the manufacture of water-soluble dyestuffs of the anthraquinone series, further characterized in that the condensation is carried out in an aqueous medium and in a carbon dioxide atmosphere in presence of acid binding agents and of catalyzers.

Still another object of the present invention are the water-soluble dyestuffs of the general formula:

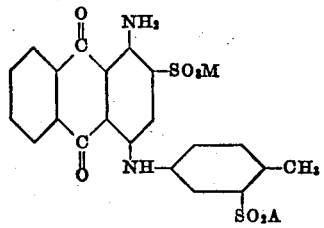

wherein A represents an alkylated amino group and M represents an alkali metal, which dyestuffs dye animal fibres fast blue shades.

The following examples, without being limitative, show the manner in which the process can be carried out, the parts being by weight:—

*Example 1*

A mixture consisting of 15 parts of the sodium salt of 1-amino-4-bromoanthraquinone-2-sulphonic acid, of 12 parts of 4-amino-1-methylbenzene-2-sulph-dimethylamide, of 4.5 parts of sodium bicarbonate, of 0.3 part of cuprochloride and of 150 parts of water is stirred at 90–95° C. during 3–4 hours in a carbon dioxide atmosphere in a vessel provided with a reflux condenser.

The reaction mixture is then poured into a diluted aqueous solution of sodium chloride, the precipitate is filtered off, dissolved in water, separated by filtration from the copper salts and salted out.

In dry state the dyestuff is a dark-blue powder, soluble in water with a pure blue coloration. In concentrated sulphuric acid it yields a weakly colored greenish blue solution, which on addition of paraformaldehyde becomes strongly colored in an emerald green shade.

The dyestuff dyes wool and silk from an acid bath pure blue shades of excellent fastness to milling, washing, perspiration and light.

The formula of the dyestuff is:

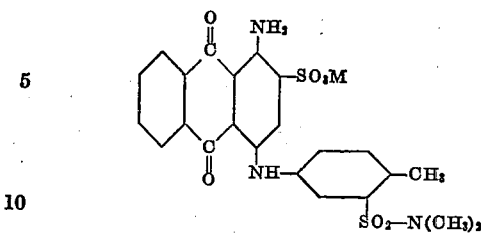

Example 2

A mixture consisting of 12 parts of 4-amino-1-methylbenzene-2-sulph-mono(methyl)amide, of 15 parts of 1-amino-2-sulpho-4-bromoanthraquinone, of 15 parts of sodium bicarbonate, of 1 part of copper powder and of 400 parts of water is stirred in a carbon dioxide atmosphere during 16 hours at 60° C. The dyestuff thereby obtained is filtered, dissolved in water, filtered again, and salted out.

In dry state the dyestuff thus obtained is a dark blue powder, soluble in water with a pure blue coloration. In sulphuric acid it gives a dull blue solution which in presence of boric acid and on heating becomes colored in a green-blue shade; on addition of formaldehyde, the sulphuric acid solution becomes emerald green.

The dyestuff dyes wool and silk from an acid bath a pure blue shade of very good fastness to milling, washing, perspiration and light.

By using the respective quantities of 1-amino-2-sulpho-4-chloroanthraquinone instead of the bromo-derivative, the same dyestuff will be obtained.

The formula of the dyestuff is

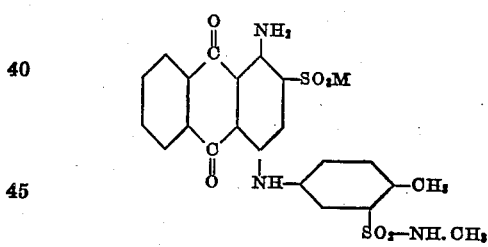

What I claim is:—

1. A process for the manufacture of water-soluble dyestuffs of the anthraquinone series, consisting in heating a 1-amino-2-sulpho-4-halogenathraquinone with a 4-amino-1-methylbenzene-2-sulph-(alkyl)amide in presence of acid binding agents.

2. A process for the manufacture of water-soluble dyestuffs of the anthraquinone series, consisting in heating a 1-amino-2-sulpho-4-halogenanthraquinone with a 4-amino-1-methylbenzene-2-sulph-(alkyl)amide in an aqueous medium and in presence of acid binding agents.

3. A process for the manufacture of water-soluble dyestuffs of the anthraquinone series, consisting in heating a 1-amino-2-sulpho-4-halogenanthraquinone with a 4-amino-1-methylbenzene-2-sulph-(alkyl)amide in an aqueous medium in presence of acid binding agents and of copper salts.

4. A process for the manufacture of water-soluble dyestuffs of the anthraquinone series, consisting in heating a 1-amino-2-sulpho-4-halogenanthraquinone with a 4-amino-1-methylbenzene-2-sulph-(alkyl)amide in an aqueous medium and in a carbon dioxide atmosphere, in presence of acid binding agents and of copper salts.

5. A process for the manufacture of a water-soluble dyestuff of the anthraquinone series, consisting in heating up to 60–90° C. 1-amino-2-sulpho-4-bromo-anthraquinone with 4-amino-1-methylbenzene-2-sulph-(monomethyl)amide in an aqueous medium and in a carbon dioxide atmosphere, in presence of sodium bicarbonate and copper salts.

6. A process for the manufacture of a water-soluble dyestuff of the anthraquinone series, consisting in heating up to 60–90° C. 1-amino-2-sulpho-4-bromoanthraquinone with 4-amino-1-methylbenzene-2-sulph(dimethyl)-amide in an aqueous medium and in a carbon dioxide atmosphere, in presence of sodium bicarbonate and copper salts.

7. The water-soluble blue dyestuffs of the general formula:

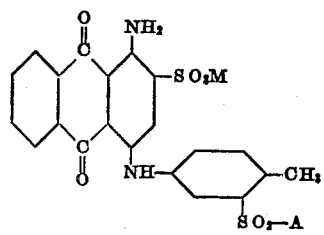

wherein A represents an alkylated amino group and M represents an alkali metal, which dyestuffs are in dry state dark blue powders soluble in water with a blue coloration, which give in sulphuric acid in presence of formaldehyde an emerald green coloration and which dye animal fibres fast blue shades.

8. The water-soluble blue dyestuff of the formula:

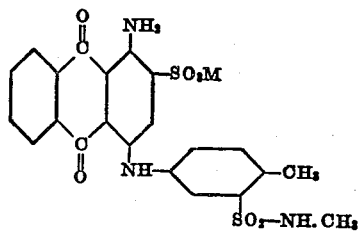

wherein M represents an alkali metal, said dyestuff being in dry state a dark-blue powder, soluble in water with a blue coloration and yielding in sulphuric acid a dull-blue solution, that on addition of formaldehyde becomes emerald-green, and dyeing wool and silk fast blue shades.

9. The water-soluble blue dyestuff of the formula:

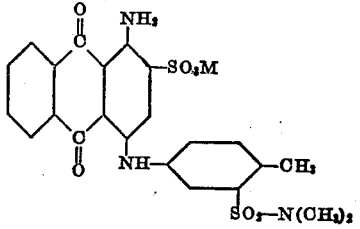

wherein M represents an alkali metal, said dyestuff being in dry state a dark-blue powder, soluble in water with a blue coloration and yielding in sulphuric acid a greenish-blue solution, that on addition of formaldehyde becomes emerald-green, and dyeing wool and silk fast blue shades.

ALBIN PETER.